US007647865B2

(12) United States Patent
Vidondo

(10) Patent No.: US 7,647,865 B2
(45) Date of Patent: Jan. 19, 2010

(54) SYSTEM FOR HEATING AND EXTRACTION OF FOOD PRODUCTS IN AUTOMATIC DISPENSING MACHINES

(75) Inventor: Félix Guindulain Vidondo, Peralta (ES)

(73) Assignee: Jofemar, S.A., Peralta (Navarra) (ES)

( * ) Notice: Subject to any disclaimer, the term of this patent is extended or adjusted under 35 U.S.C. 154(b) by 672 days.

(21) Appl. No.: 11/345,672

(22) Filed: Feb. 1, 2006

(65) Prior Publication Data

US 2006/0191914 A1 Aug. 31, 2006

(30) Foreign Application Priority Data

Feb. 2, 2005 (ES) ................................ 200500190

(51) Int. Cl.
*A47J 37/08* (2006.01)
*G07F 9/10* (2006.01)

(52) U.S. Cl. ............................ 99/334; 99/357; 99/484; 221/150 HC

(58) Field of Classification Search ................... 99/334, 99/357, 484, 486; 221/150 HC, 150 A, 150 R
See application file for complete search history.

(56) References Cited

U.S. PATENT DOCUMENTS 3,397,817 A 8/1968 Smith
4,349,714 A 9/1982 Tamano
4,398,651 A * 8/1983 Kumpfer ....................... 221/6
4,687,119 A 8/1987 Juillet
4,762,250 A * 8/1988 Friberg ....................... 221/123
5,105,979 A * 4/1992 Bakx et al. ............ 221/150 HC
5,245,150 A 9/1993 Grandi
6,498,329 B1 * 12/2002 Gibernau .................... 219/762

FOREIGN PATENT DOCUMENTS

| | | |
|---|---|---|
| CA | 2153738 | 1/1997 |
| EP | 0459160 | 12/1991 |
| EP | 0791902 | 8/1997 |
| EP | 0866430 | 9/1998 |
| EP | 1176564 | 1/2002 |
| FR | 2718624 | 10/1995 |
| FR | 2754087 | 4/1998 |
| FR | 2824168 | 10/2002 |

* cited by examiner

*Primary Examiner*—Reginald L Alexander
(74) *Attorney, Agent, or Firm*—Klauber & Jackson L.L.C.

(57) ABSTRACT

System for the heating and extraction of food products in automatic dispensing machines, for use in automatic dispensing machines for food products conserved on cold trays until their consumption and which also have means of heating the products based on a microwave oven, in such a manner that the system comprises means of handling the products in their heating and extraction phase, said means of handling being connected by a hatch (7) with a cubicle (4) for the housing of some storage trays (5) for the products.

16 Claims, 17 Drawing Sheets

Figure 1:
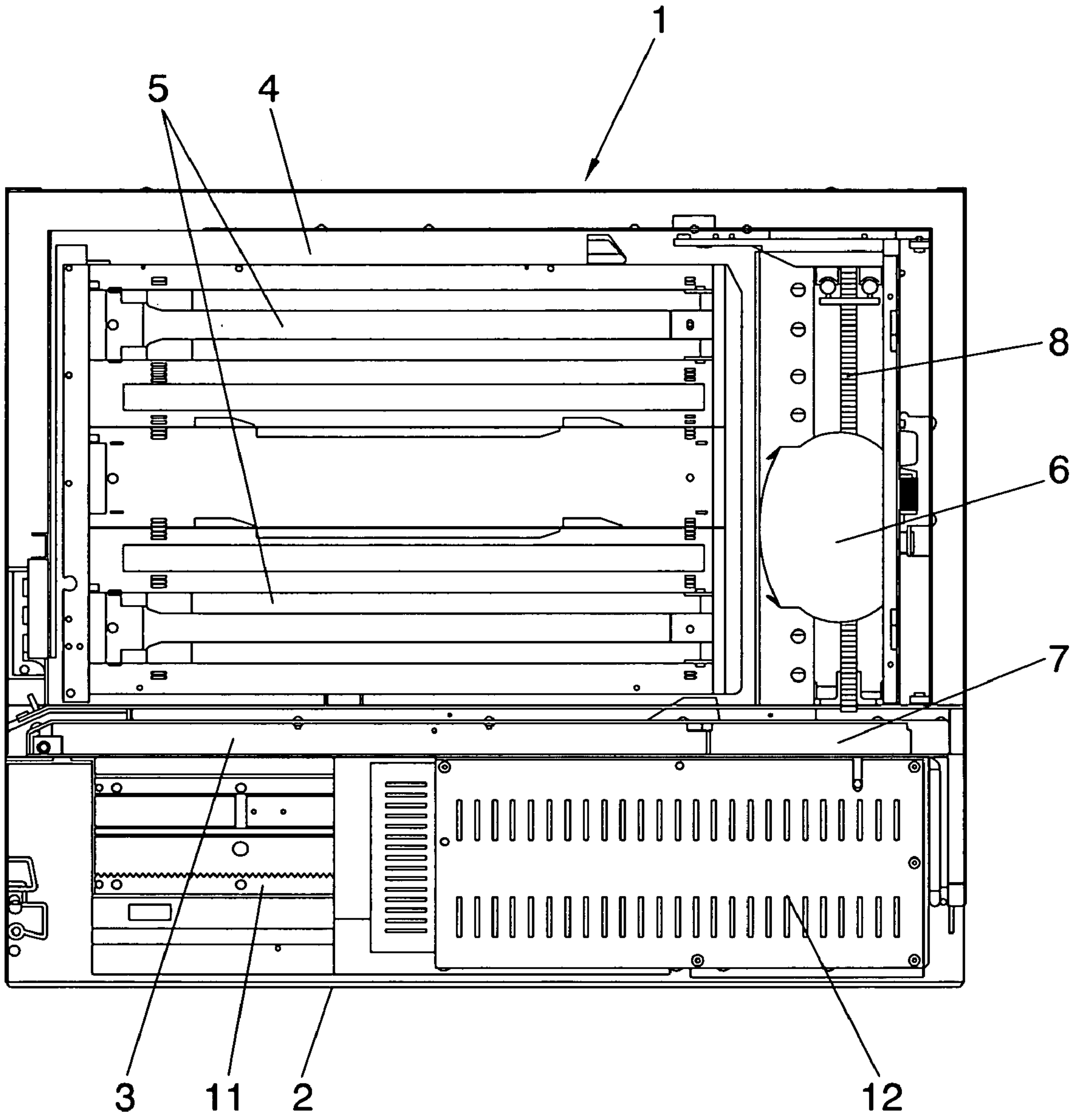

SYSTEM FOR HEATING AND EXTRACTION OF FOOD PRODUCTS IN AUTOMATIC DISPENSING MACHINES

OBJECT OF THE INVENTION

As stated in the title of this specification, the following invention relates to a system for the heating and extraction of food products in automatic dispensing machines, being of the type of automatic dispensing machine which is provided with cold equipment for maintenance of the food products at a suitable conservation temperature until their consumption and which likewise have means of heating the products based on a microwave oven, such that a primary objective of the system that is presented is to be able to optimise the space by being able to store and dispense a large variety of food products which have to be conserved cold for their consumption hot at the appropriate temperature.

The system comprises means of handling the products in the heating and extraction phase which simultaneously act as security means by avoiding possible manipulation from the outside and in the event of possible actions, whether voluntary or involuntary, which could affect the functioning of the microwave.

FIELD OF APPLICATION

This specification describes a system for the heating and extraction of food products in automatic dispensing machines, being of the type of automatic dispensing machine for food products including cooked, refrigerated and/or frozen, having special application for its installation in companies and industry, as well as in public bodies, airports, hospitals, schools, etc., permitting users to select from a wide range of products.

PRIOR ART OF THE INVENTION

Automatic dispensing machines incorporating cold equipment are used for the dispensing of cold drinks or refrigerated and/or frozen food products, which have to be kept at low temperature.

So, a large number of products, such as custards, yoghurts, baked custards and other desserts, as well as products prepared with milk or cream-based products, snacks and ice-creams are consumed directly they are dispensed.

In this way, we can cite Invention Patent ES 2137895 from the same holder as the present application, which describes a "dispensing machine" that incorporates cold equipment for the conservation of refrigerated products in a series of stacked trays, which products are guided in their extraction to a transverse tray for transportation to the collection box. The trays for depositing the products remain housed in a cubicle closed by an internal door, with the aim of maintaining their temperature, the products being extracted towards the collection box via a first hatch of the internal door. The products are brought to the collection box via a second hatch of the external door of the machine.

We can likewise cite Addition Certificate ES 2150385 to the Main Patent ES 2137895 in which certain improvements are described based on the incorporation into a dispensing machine of an isolating plate which defines two compartments with different temperature.

Moreover, certain refrigerated and/or frozen products for their consumption have to be heated for which the automatic dispensing machines incorporate certain means of heating the product.

So, we can cite Invention Patent ES 2110904 which describes a "dispensing machine for packaged food products", being provided with a microwave oven suitable for adopting a first feed and collection position for the products and a second position for cooking. For this it has a device based on a rotary arm with a yoke.

We can likewise cite Invention Patent ES 2130057 in which a "food dispensing machine" is described, and Invention Patent ES 2155327 in which a "food products dispensing machine" is presented, in both cases incorporating heating by microwave with an access door that can be actuated.

We can equally cite Utility Model ES 1024665, in which is described a "dispensing machine for food prepared cold without conservation, distributed on a unitary basis in the hot state", in such a way that it incorporates a microwave on which the products are arranged stacked with a silo which guides the trays with the corresponding product towards it. For this, the microwave has an entrance door in its upper part that can be actuated, while for its exit it has a thruster which expels the product through a front door.

Finally, we can cite the Utility Model ES 1057781 in which a "dispensing machine for bread and/or buns" is described, provided with a container for bread and/or buns for storage of the products with a lower exit for those products on a unitary basis.

DESCRIPTION OF THE INVENTION

The present specification describes a system for the heating and extraction of food products in automatic dispensing machines, being of the type of automatic dispensing machine which is provided with cold equipment for maintenance of the food products at a suitable conservation temperature until their consumption, being stored on a series of trays and which upon their extraction are first of all transported to a tray transverse to them, housed in a cubicle close by an internal door and which likewise have means of heating the products based on a microwave oven, such that the system comprises means of handling of the products in their heating and extraction phase, said means of handling being connected by a hatch with a cubicle for the housing of storage trays for the products, and the means of handling of the products in their heating and extraction phase being defined by:

- a vertical duct, open above and below, formed in relation to an access hatch for the products to dispense made in an internal door for closing and separating the cubicle for the housing of trays with the stored products;
- a body internal to the vertical duct and of similar section with its upper base closed for the depositing of products to be dispensed via the hatch of the internal door, said internal body being displaceable in the ascending-descending direction.
- a platform, horizontally displaceable, for closure of the open upper base of the vertical duct and sweeping of the upper base of the body internal to the vertical duct;
- a microwave oven with a lower opening of similar section to the body internal to the vertical duct, in relation to which it has been made.

Following the dispensing and depositing of the corresponding product on the upper base of the body internal to the vertical duct, via the hatch of the internal door for closing and separating the cubicle for housing the trays with the stored products, said internal body undergoes a slight descent, in such a way that perfect seating and depositing of the product is permitted.

Once the product has been deposited on the closed upper base of the body internal to the vertical duct and has descended slightly, its ascent then takes place until the product remains inside the microwave for its heating, in such a way that said body carrying the product to heat closes the lower opening of the microwave.

Moreover, in a first displacement of the closing platform for the upper base of the vertical duct, from its rest position to that of closing the upper base of the vertical duct, the hatch of the internal door becomes blocked, the body carrying the heated product having descended as far as leaving the said product in relation to the hatch of the external closing door of the machine for the product to be collected by the user via a hatch in the external closing door.

So, the platform for closing the open upper base of the vertical duct acts as a security element preventing any possible access or manipulation in the event of an attempt to gain access via the hatch of the external door.

In addition, once the user has collected the product, the body on whose upper base the product was deposited ascends as far as the lower part of the closing platform for the open upper base of the vertical duct.

In the event that, due to any circumstance, the product has not been collected, when the body on whose base the product continues to be deposited ascends, it runs up against the closing platform for the open upper base of the vertical duct, inverting the direction of displacement and returning to the position in which the product will again remain in relation to the hatch of the external door for being able to be collected by the user.

A second displacement of the closing platform for the open upper base of the vertical duct, from its closed position of the upper base of the vertical duct to the rest position, with the upper base of the depositing body for the products beneath that platform, provokes a sweeping of the upper base of the body internal to the vertical duct.

So, in the sweeping of the upper base of the body internal to the vertical duct by means of the upper platform, any possible object deposited thereon will be displaced to a reception receptacle.

In this way, if, voluntarily or involuntarily, at the moment the user collects the product, any object remains deposited on the closed upper base of the body carrying the products to the microwave, it will be cleaned before any new heating takes place. So, the possibility of the functioning of the microwave being affected is prevented.

Finally, after the sweeping of the upper base of the body internal to the vertical duct, said body descends to its initial rest position with its upper base closed at a level below the hatch of the internal door for closing and separating the cubicle for housing the storage trays for the products, being left ready for commencing a new cycle of extraction and heating of a product.

Below, in order to complement the description that is going to be made forthwith, and with the aim of aiding a better understanding of the characteristics of this invention, this specification is accompanied by a set of plans in whose figures, by way of illustration only and not limiting, the most characteristic details of the invention have been represented.

BRIEF DESCRIPTION OF THE DESIGNS

FIG. 1. Shows a view, according to a transverse cut, of the automatic dispensing machine, in which can be seen the cubicle for housing the storage trays for the products, a tray transverse to them, an internal separation door, an external door for closure of the machine, a microwave and a platform.

Figure 2:
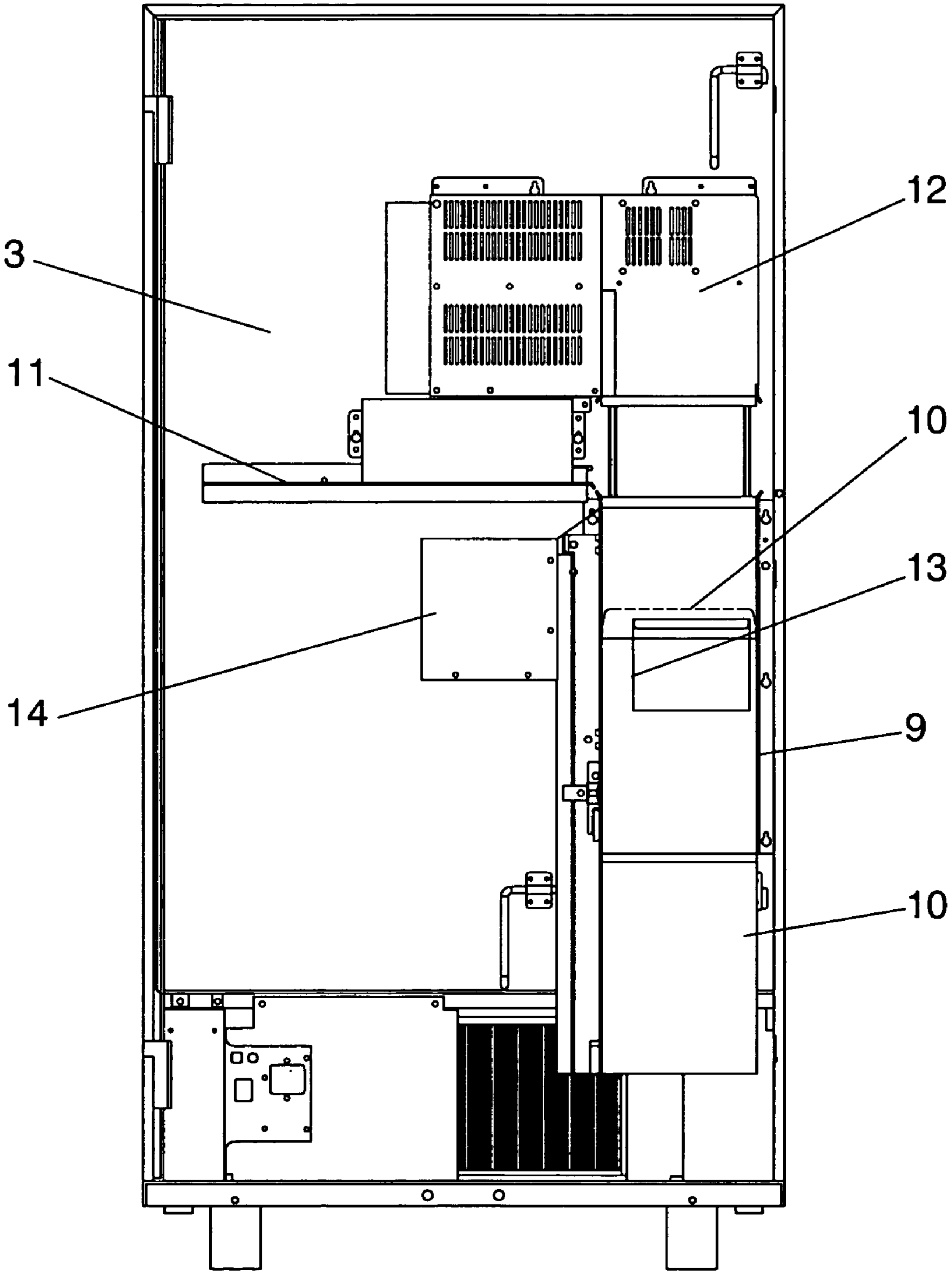

FIG. 2. Shows a front view of the heating and extraction means associated with the internal door for closing and separating the cubicle for housing the storage trays for the products.

Figure 3:
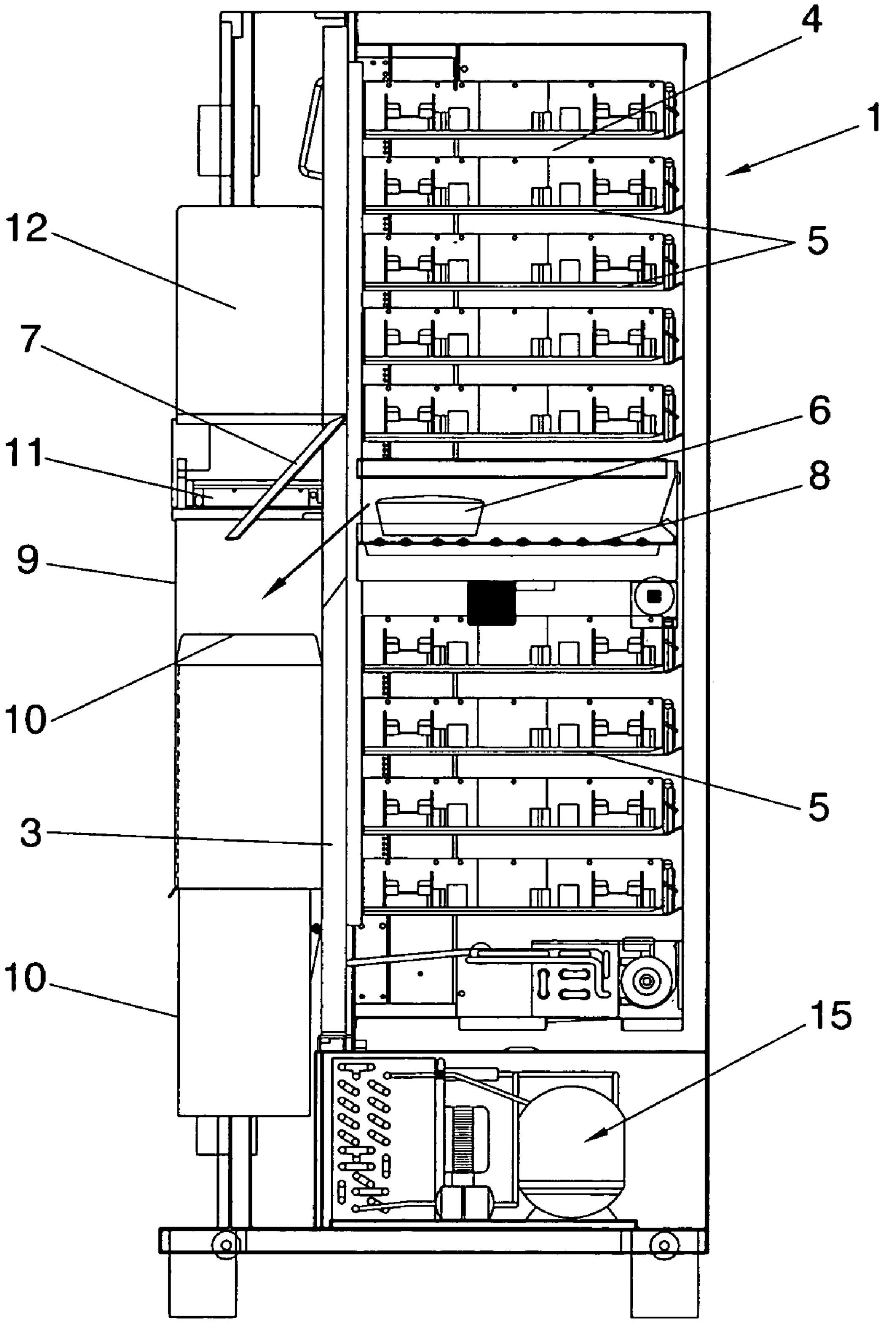

FIG. 3. Shows a side elevation view of the previous figure in which can be seen the transverse tray for reception of the products from the storage trays for their transportation to the heating and extraction means via a hatch of an internal door for their location on the upper base of a body internal to a vertical duct formed in relation to the hatch of the internal door.

Figure 4:
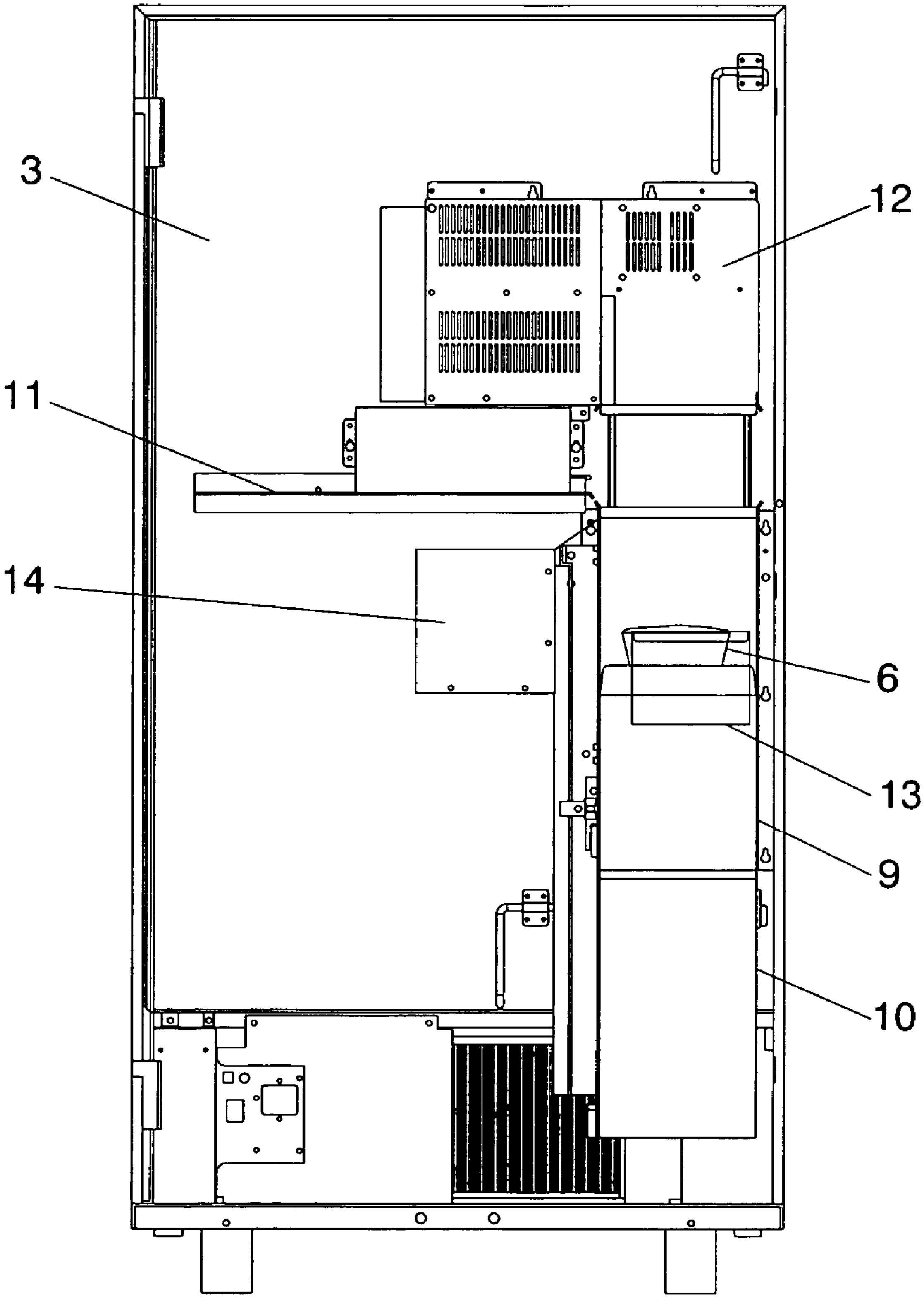

FIG. 4. Shows a front view in which the body internal to the vertical duct formed in relation to the hatch of the internal door has received a product on its upper base and has descended slightly in order to permit closure of the hatch.

Figure 5:
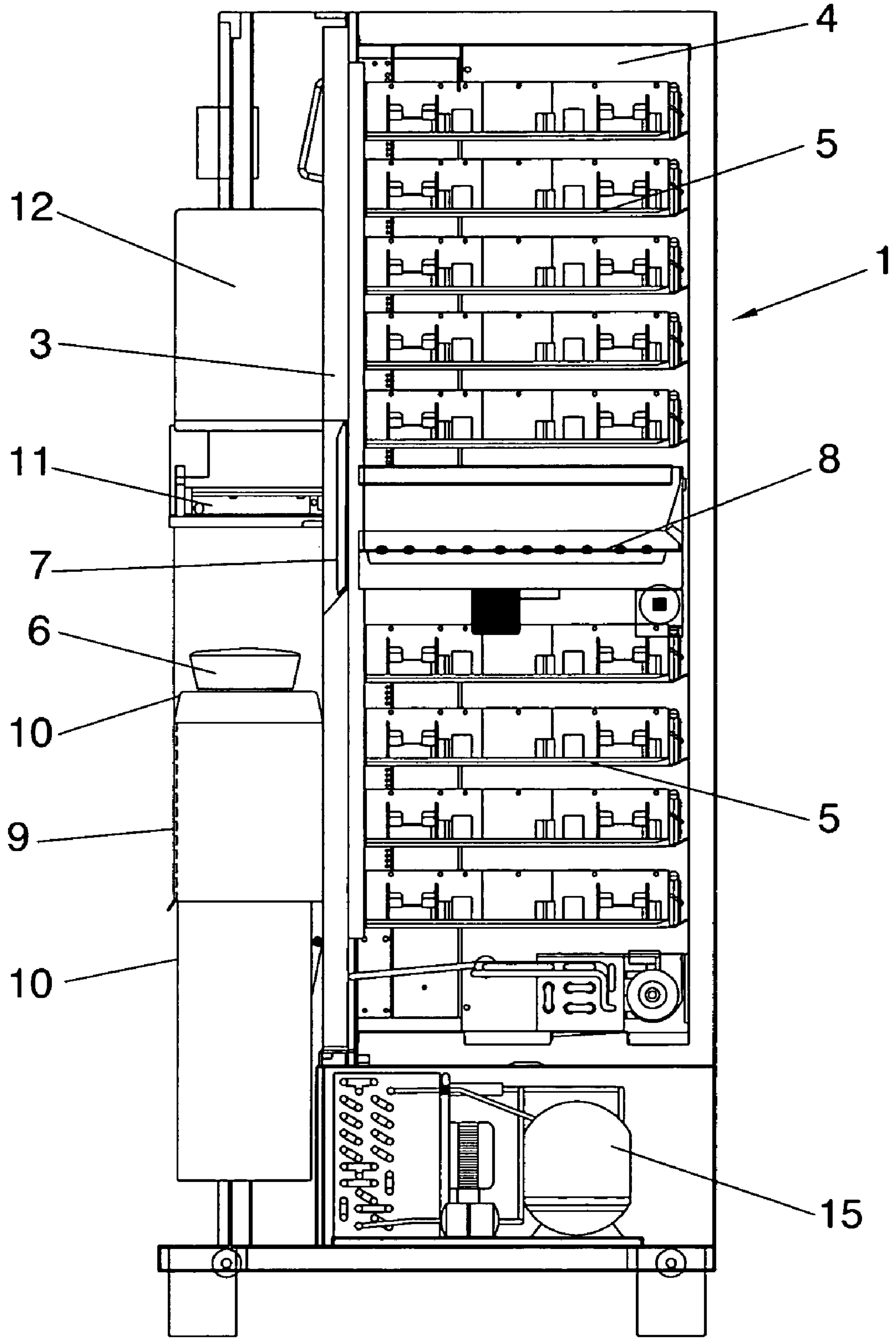

FIG. 5. Shows a side elevation view of the previous figure in which it can be seen how the body internal to the vertical duct formed in relation to the hatch of the internal door has descended slightly.

Figure 6:
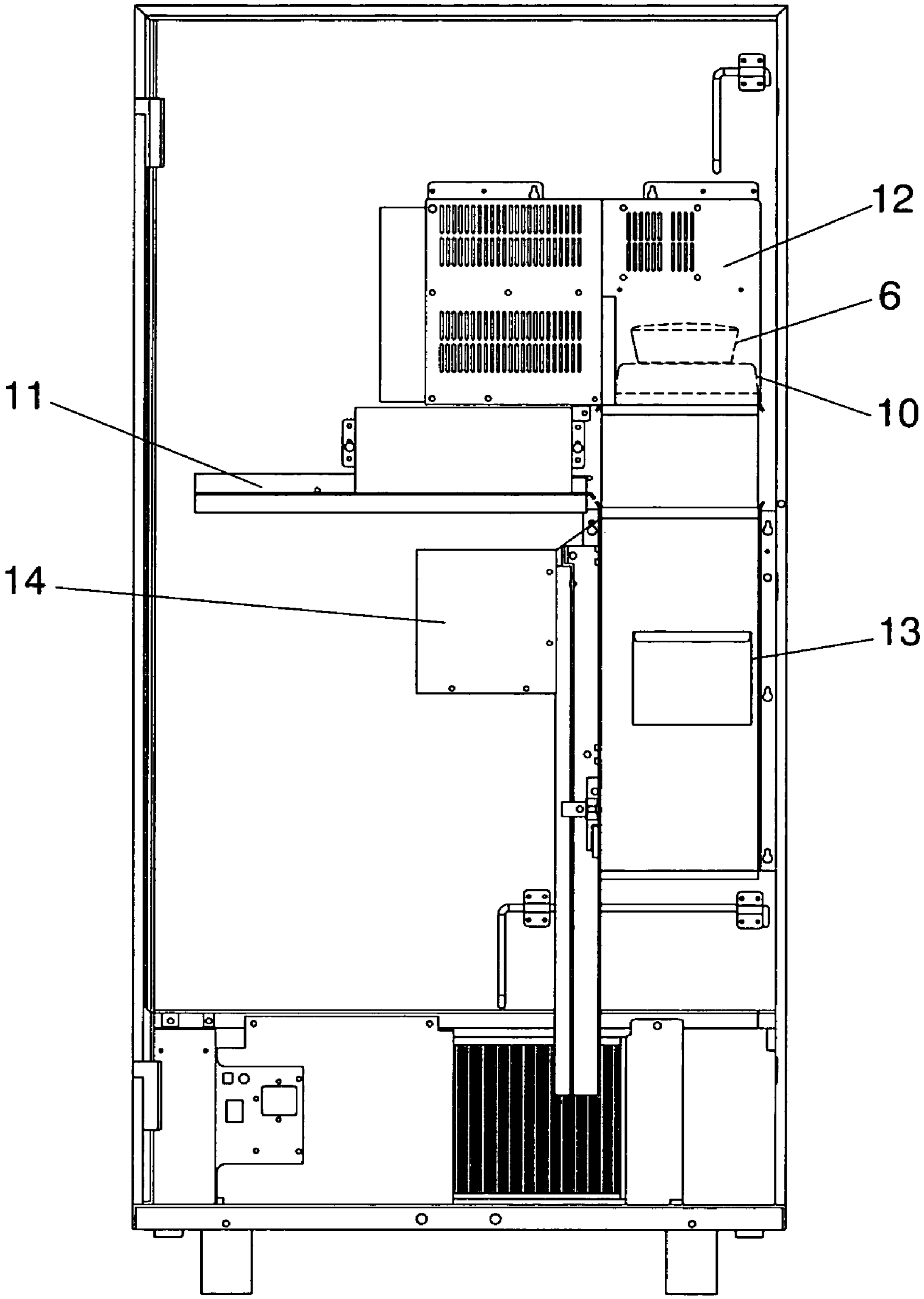

FIG. 6. Shows a front view in which the body internal to the vertical duct formed in relation to the hatch of the internal door with the product on its upper base has ascended as far as the microwave closing a lower opening thereof.

Figure 7:
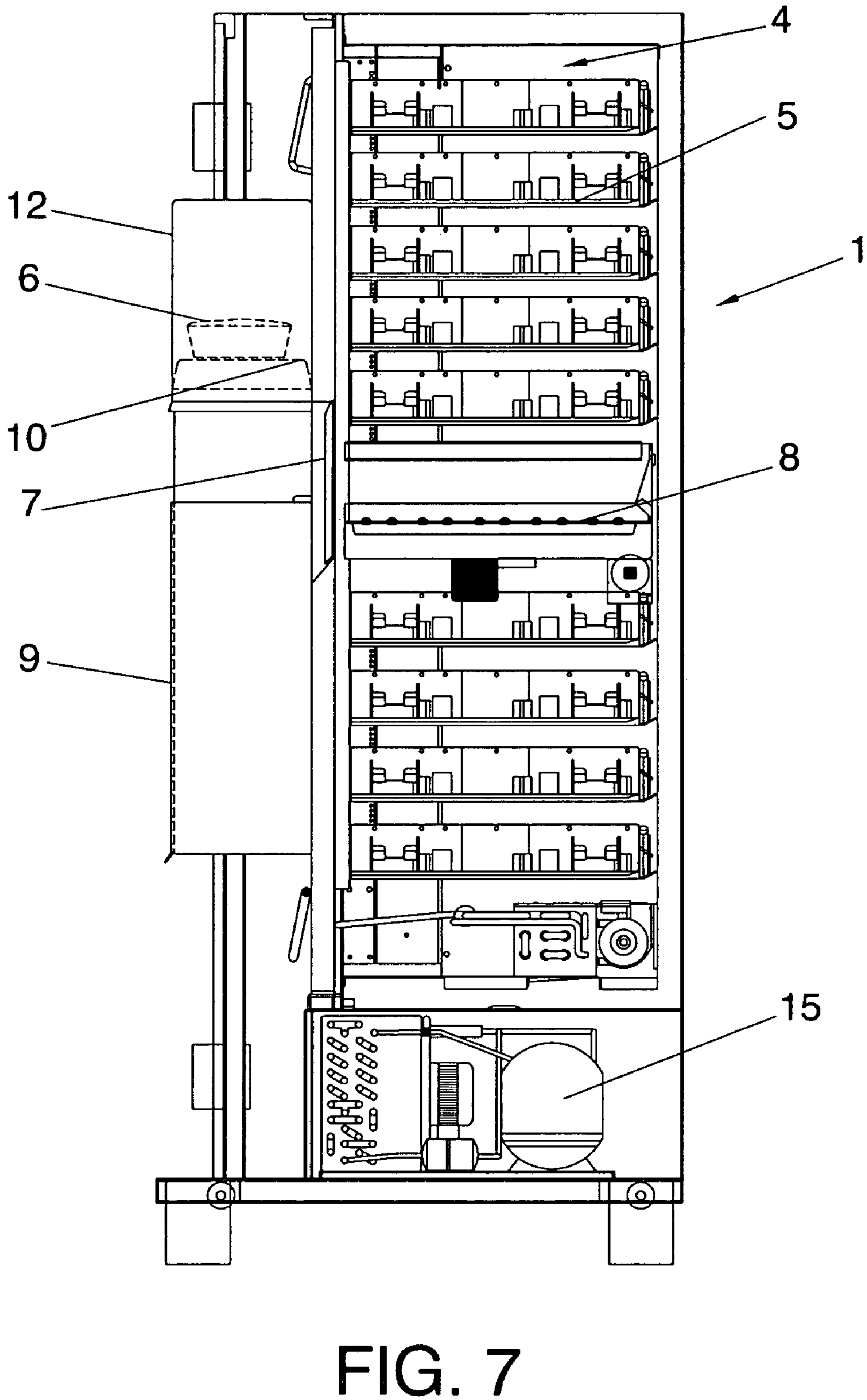

FIG. 7. Shows a side elevation view of the previous figure in which, by means of dotted lines, the product can be seen inside the microwave for being heated.

Figure 8:
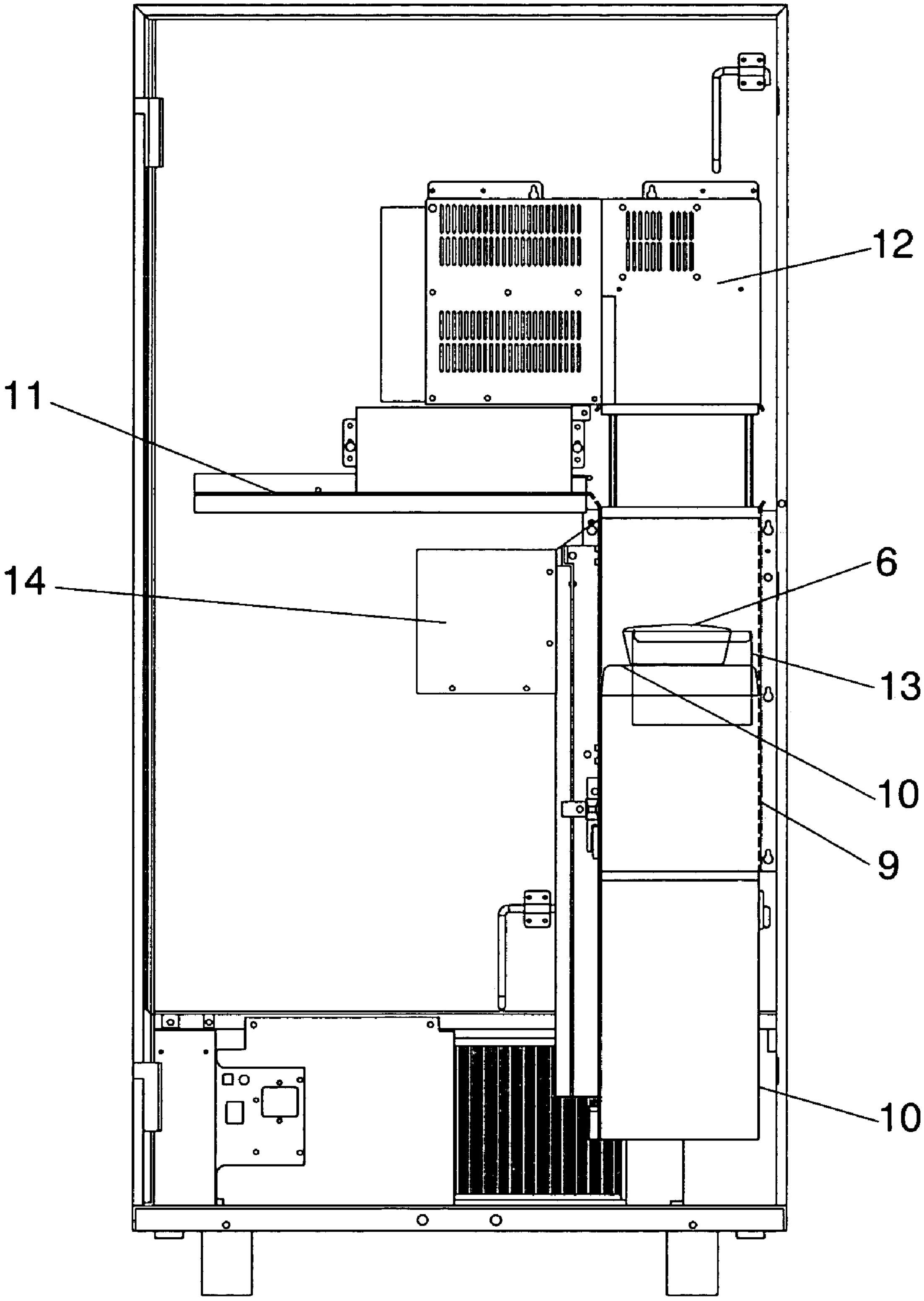

FIG. 8. Shows a front view in which, once the product has been heated, the body on whose upper base the heated product is deposited has descended as far as blocking the hatch of the internal door and the upper closing platform of the vertical duct has become displaced.

Figure 9:
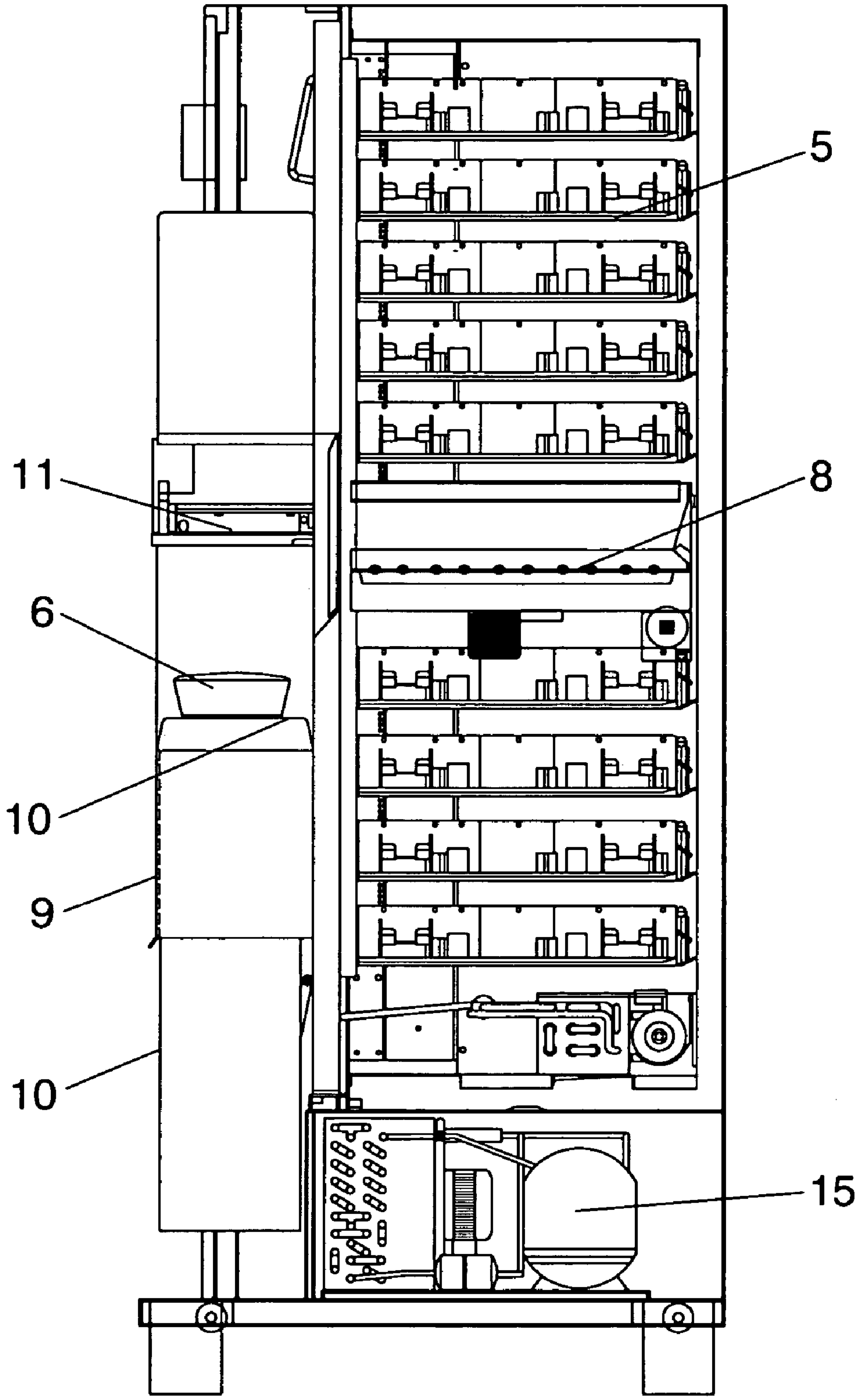

FIG. 9. Shows a side elevation view of the previous figure.

Figure 10:
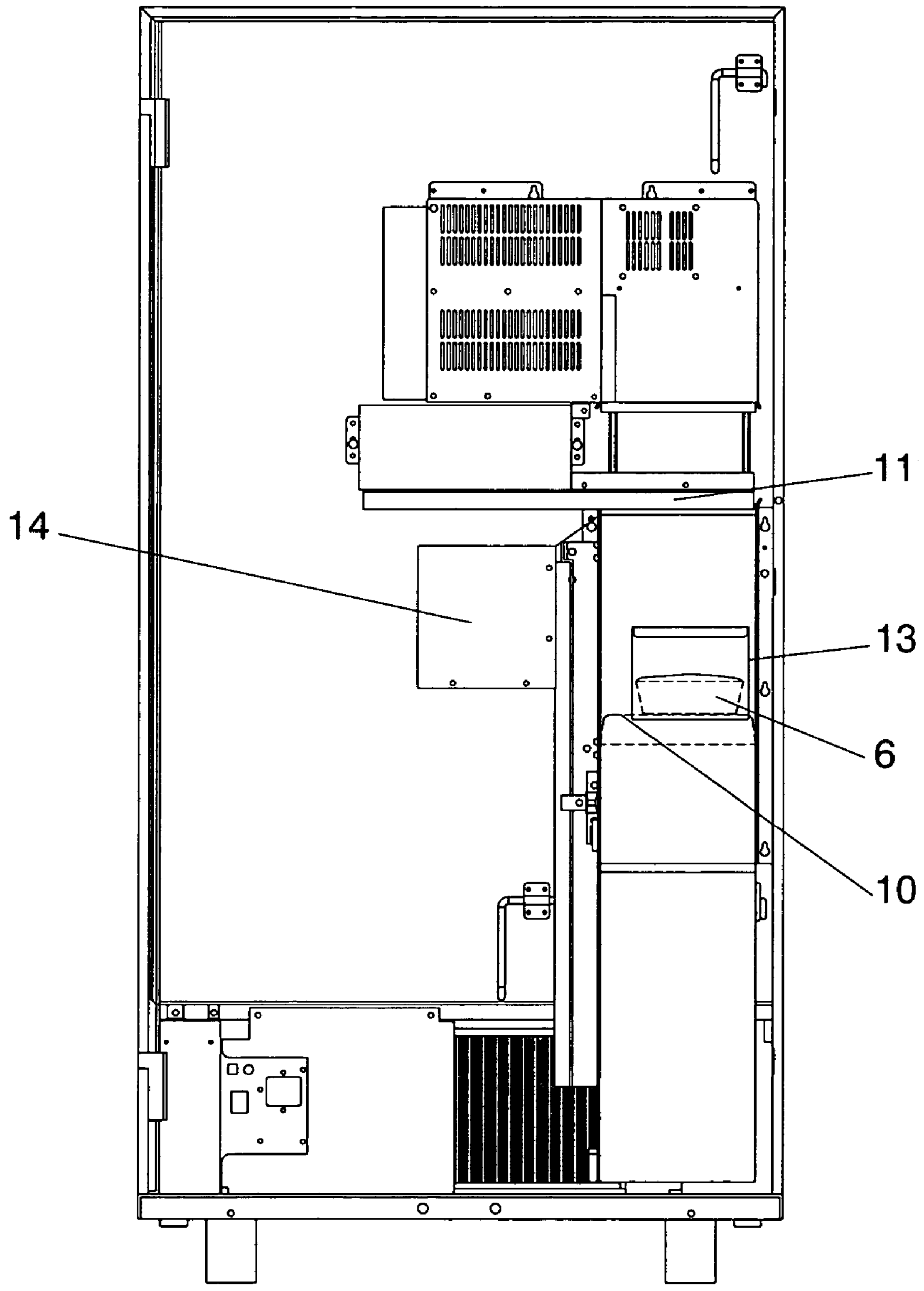

FIG. 10. Shows a front view in which the body on whose upper base the heated product is deposited has descended slightly in order to be positioned in relation to the collection hatch made in the external door of the machine.

Figure 11:
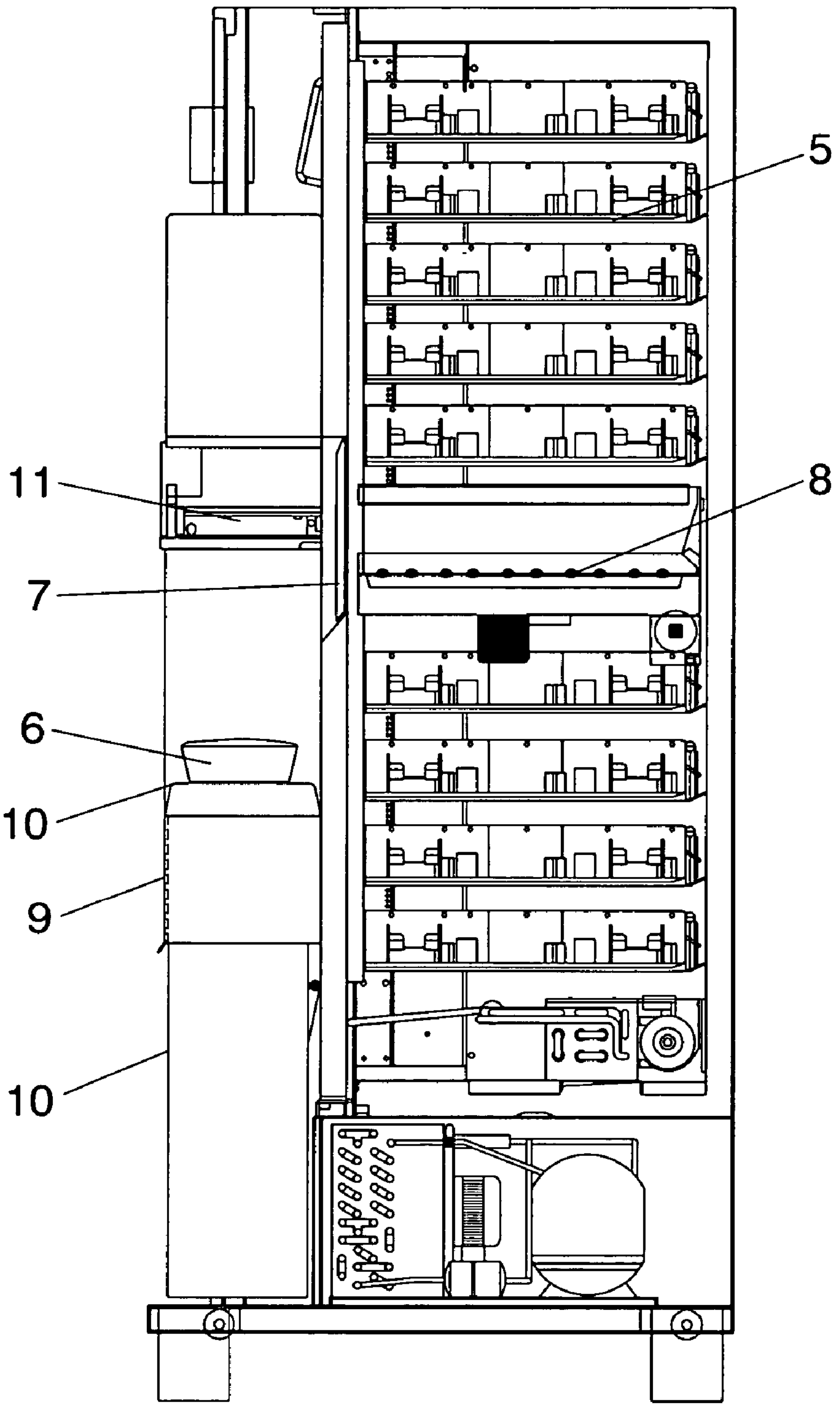

FIG. 11. Shows a side elevation view of the previous figure.

Figure 12:
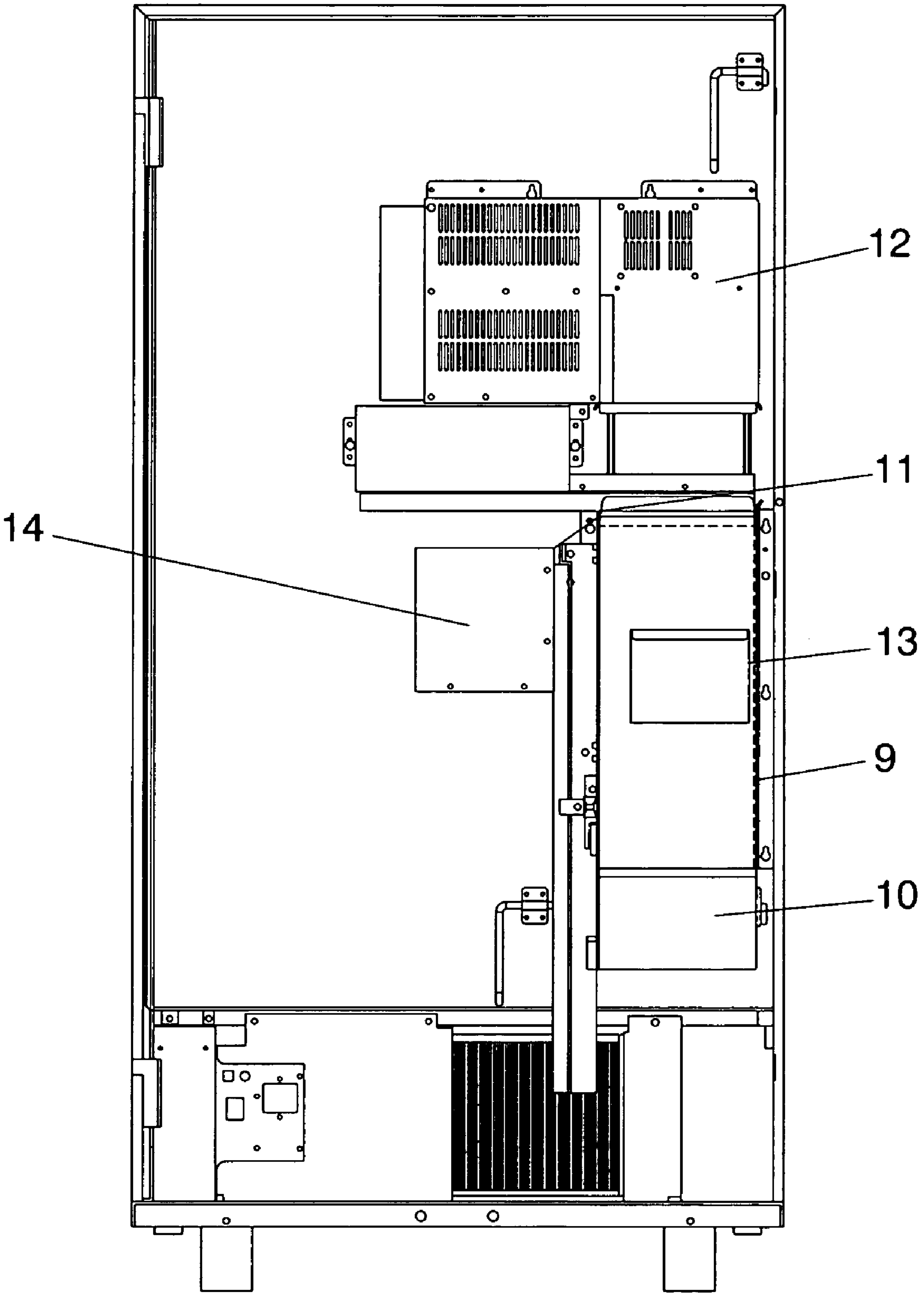

FIG. 12. Shows a front view in which, once the product has been collected, the body whose upper base it was deposited on has ascended until its upper base remains in relation to a lower sweeping element of the upper closing platform of the vertical duct.

Figure 13:
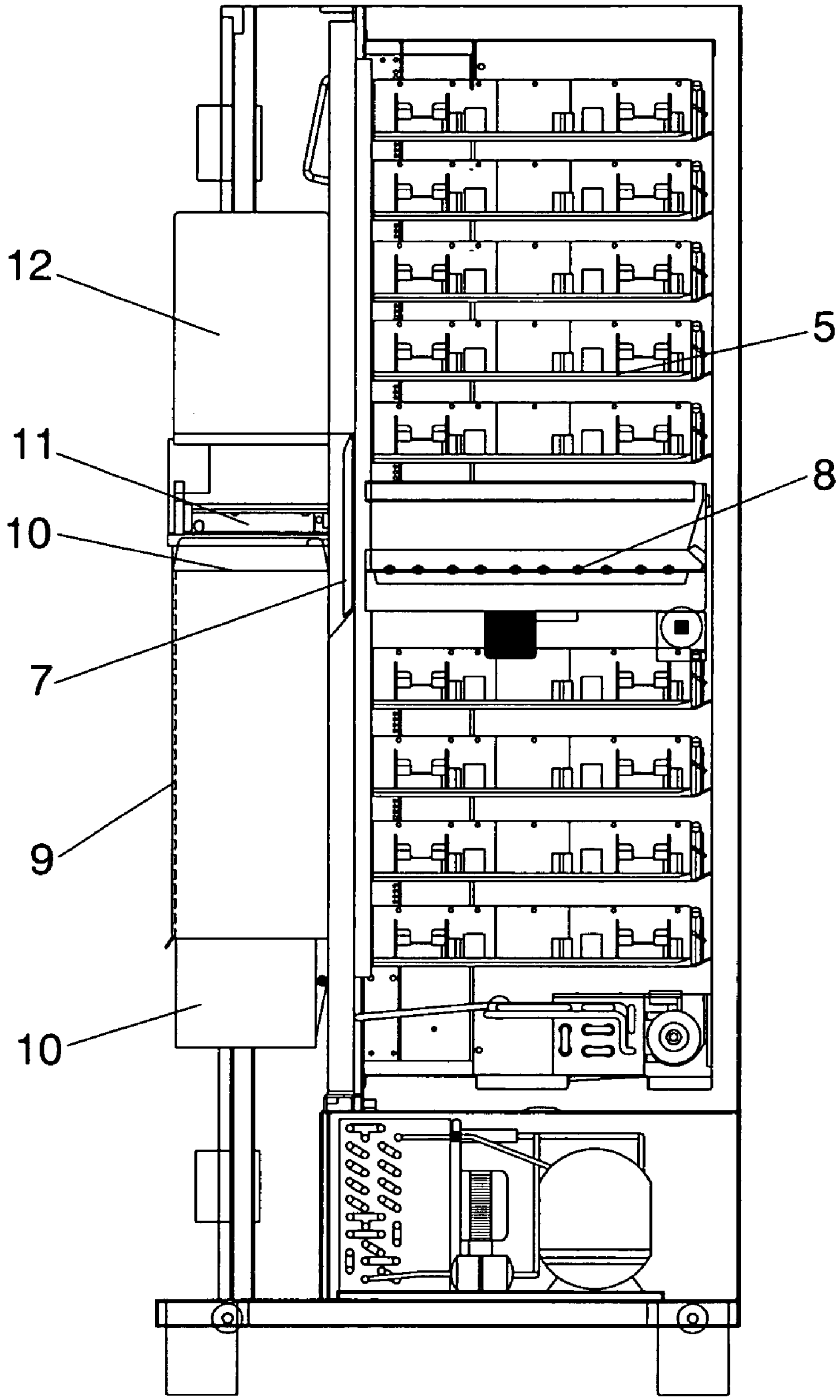

FIG. 13. Shows a side elevation view of the previous figure.

Figure 14:
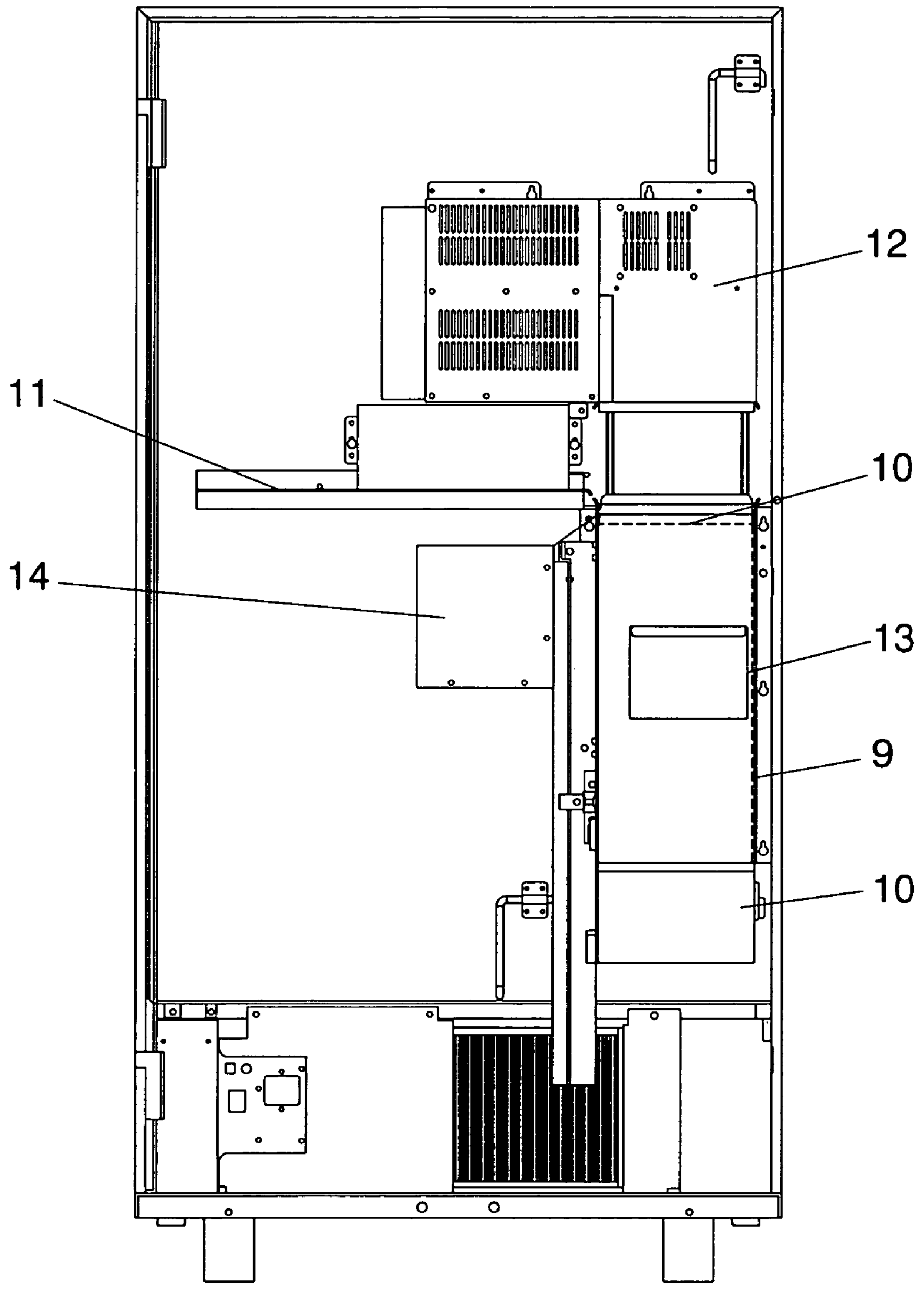

FIG. 14. Shows a front view in which the upper closing platform of the vertical duct has been displaced effecting a sweep of the upper base of the body on which the products were located for being heated.

Figure 15:
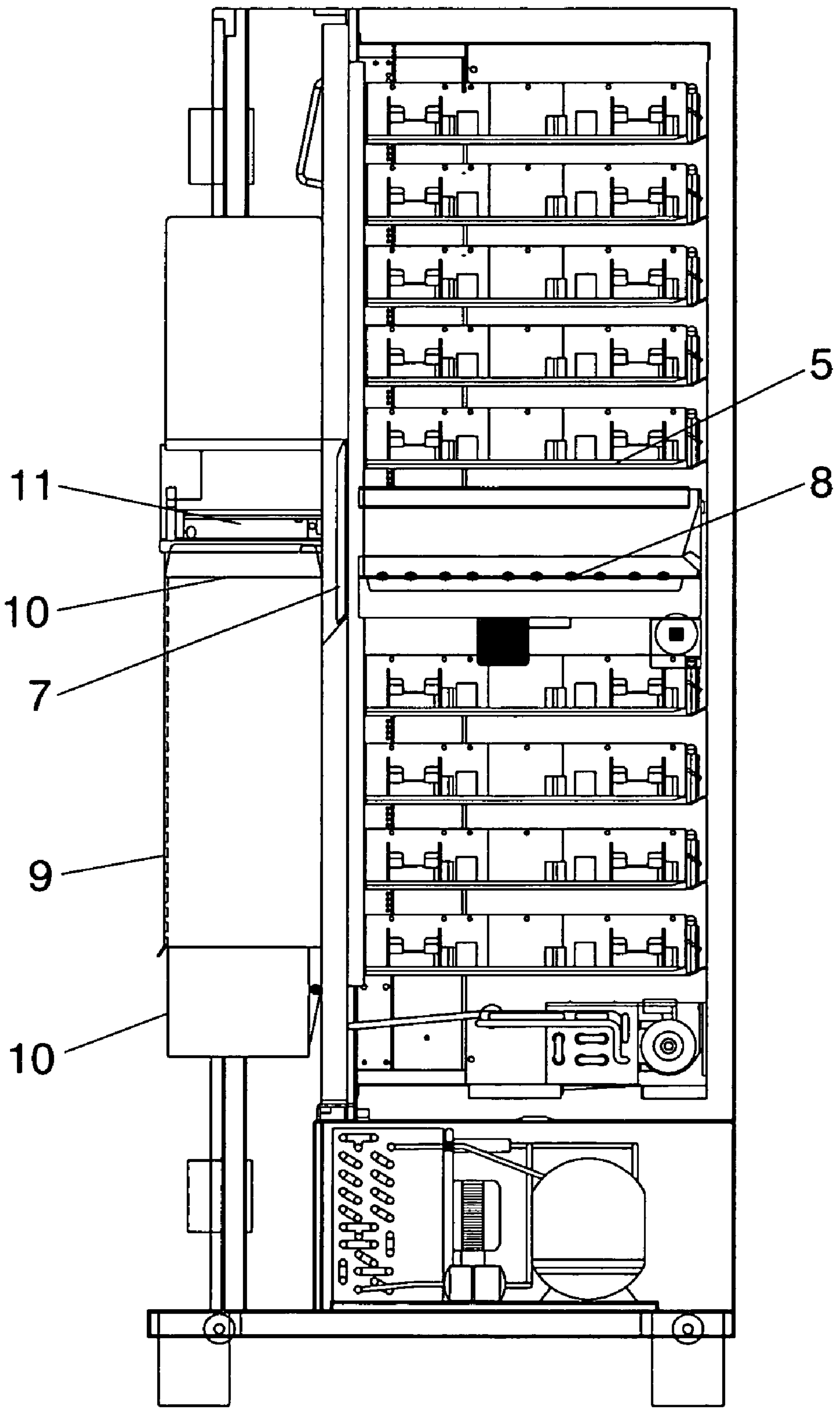

FIG. 15. Shows a side elevation view of the previous figure.

Figure 16:
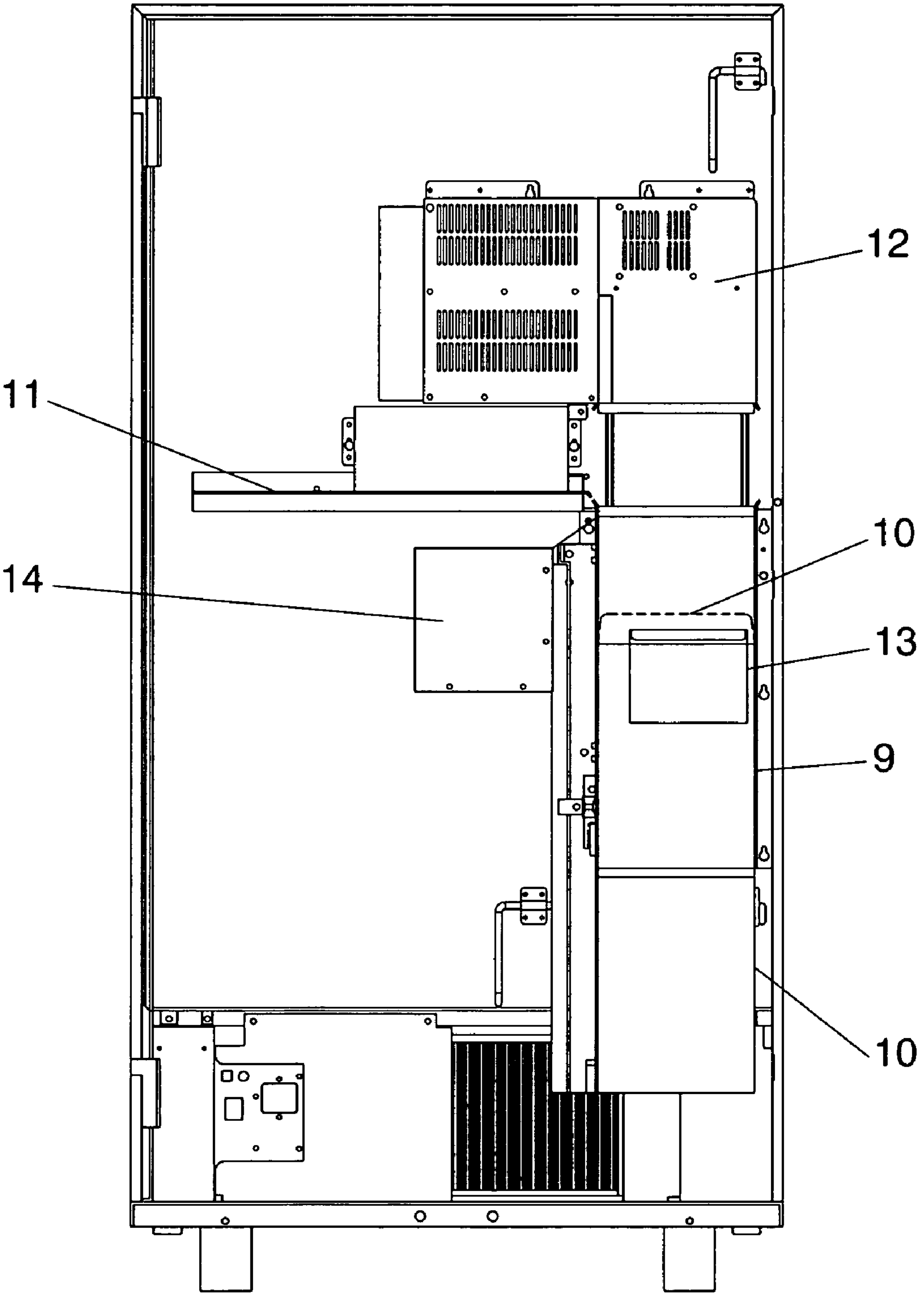

FIG. 16. Shows a front view in which, having effected the sweeping of the upper base of the body on which the products were located for being heated, it has descended and remains in position for initiating a new cycle.

Figure 17:
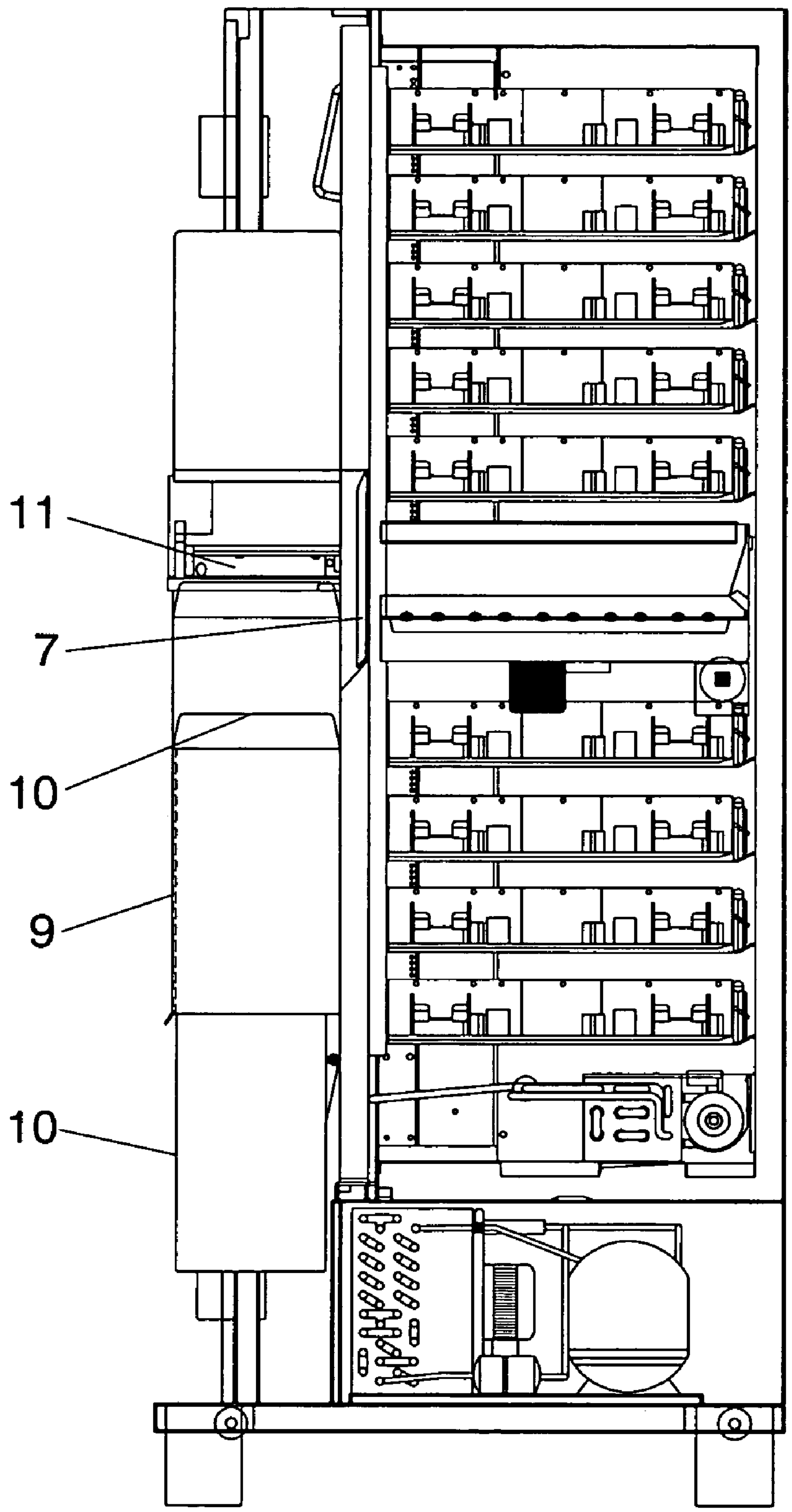

FIG. 17. Shows a side elevation view of the previous figure.

DESCRIPTION OF A PREFERRED EMBODIMENT

With said figures in view and in accordance with the numbering adopted, we can see how the automatic dispensing machine 1, provided with conventional means of product selection and prior payment, has an external closing door 2 and an internal door 3 for closing and separating a cubicle 4 housing a series of trays 5 on which are stored the different products 6 which are first dispensed directly to a transverse tray 8, with some heating and extraction means of the products 6 being associated with the internal door 3.

The automatic dispensing machine 1 is of the type of machine provided with cold equipment 15 with the aim of being able to store refrigerated and/or frozen food products on the trays 5 housed in the cubicle 4.

So, the heating and extraction means of the products 6 are kept separated from the cubicle 4, the cubicle 4 being connected with the heating and extraction means of the products via a hatch 7 made in the internal door 3 for passage of the products to dispense.

Moreover, the dispensing of the products 6 from the cubicle 4 via the hatch 7 is carried out by means of the tray 8 provided in the transverse position to the storage trays 5 for the products to dispense, in such a way that both the storage trays 5 for the products and the dispensing tray 8 are provided with a conveyor belt with some thrusters which drag the products along.

Thus, the products stored on the series of trays 5 are kept at the right conservation temperature until their consumption, for which the trays 5 are housed in the cubicle 4 closed by an internal separation door 3 and, in a first dispensing, the products are transported to the transverse tray 8 for their transportation via a hatch 7 of the internal door 3 to the heating and extraction means.

The trays 5 are in the stacked position and the tray 8 is provided with an ascending-descending movement for remaining positioned at the height of the tray 5 from which a product is going to be dispensed and later on the tray 8 is positioned at the height of the hatch 7 for the dispensing of the product to the body 10.

The means of handling the products in their heating and extraction are created by a vertical duct 9 with its upper and lower bases open, materialised in relation to the hatch 7 of the internal door 3 for separation of the cubicle 4, in which vertical duct 9 is a body 10 with its upper base closed on which are deposited the products 6 dispensed by the tray 8 via the hatch 7.

Likewise, the means of handling the products in their heating and extraction include a platform 11 for closure of the open upper base of the vertical duct 9 and a microwave oven 12 provided with a lower opening, of similar section to that of the displaceable body 10, in the ascending-descending direction, via the vertical duct 9.

So, in an extraction cycle of a product 6, the body 10, in its initial position, lies below the level of the hatch 7 of the internal door 3, such that the corresponding product 6 dispensed by the tray 8 via the hatch 7 is deposited on the closed upper base of said body 10.

Once the corresponding body 6 has been dispensed via the hatch 7, in order for the said product to be perfectly seated on the upper base of the body 10, said body 10 descends slightly thus permitting closure of the hatch 7.

This is so with the aim of preventing a product from being able to remain in the dispensing position via the hatch 7 supported on the lower part of the exit window and thus impeding the perfect and total closure of the hatch 7.

Next, with the hatch 7 perfectly closed, the body 10 ascends via the vertical duct 9 until the product 6 deposited on the upper base of the body 10 is introduced into the microwave oven 12 and said body 10 closes the lower opening thereof, permitting perfect functioning of the microwave in heating the product.

Once the product has been heated, the body 10 descends as far the position for collection by the user with the product remaining in relation to the hatch 13 of the external door 2, and the platform 11, in a first displacement, closes the upper base of the vertical duct 9 and is positioned with respect to the hatch 7, acting as a security element, preventing its opening and any possible manipulation from the outside.

In the different figures the positioning has been represented of the hatch 13 of the external door 2 for reception of the products by the user, though the door 2 is not represented for the sake of being able to have a better understanding.

In other words, in this way it is not possible to gain access to the hatch 7 of the internal door 3 and thereby to the products stored on the trays 5 by means of inserting one's arm through the hatch 13 of the external door 2.

Once the product has been collected by the user via the hatch 13 of the external door 2, the body 10 ascends until it becomes positioned beneath the platform 11, in such a way that in a second return displacement of the closing platform 11 for the open upper base of the vertical duct 9 as far as its initial position it provokes a sweeping of the upper base of the body 10 positioned beneath it.

By means of this sweeping the aim is to sweep away any possible object which, voluntarily or involuntarily, at the moment the user collects the product, might have been left behind on the upper base of the body 10 and which in a later heating of another product could affect the microwave 12 causing a fault or even breaking it, which would lead to its having to be changed with the economic loss that this would represent.

For this, inside the machine a receptacle has been incorporated into which are displaced those objects that are swept from the upper base of the base of the body 10.

Finally, once the platform 11 has returned to its initial position with the sweeping of the upper base of the body 10 having been effected, the said body 10 descends to its initial position awaiting the start of a new extraction cycle of a product, in other words, it remains beneath the level of the exit hatch 7 for the products from the cubicle 4 as far as the means of handling in their heating and extraction.

Moreover, if the already heated product is not collected by the user and the body 10 ascends, at the moment the product runs up against the platform 11 an inversion will take place in its movement with the product again positioning itself with respect to the hatch made in the external door 2 for the product to be collected by the user.

This situation can occur when the hatch 13 made in the external door 2 is actuated and the product is not collected.

Furthermore, the hatch 13 made in the external door 2 for closing the machine is associated with a microchip in such a way at the moment that said hatch 13 opens the body 10 will become automatically static, in the event that it is in movement.

The heating time for the different products will be programmable depending on their nature.

Of course, the automatic dispensing machine 1 will also be able to store refrigerated products that do not require heating for consumption, in which case all the manoeuvres relating to heating of the products will not take place, and their direct extraction will be performed.

Making reference to the attached designs we can see how, in FIG. 1, a product 6 is to be found on the tray 8 transverse to the storage trays 5 for their dispensing via the hatch 7, to the upper base of the body 10.

The tray 8 possesses an ascending-descending movement in order to be able to remain positioned with respect to the series of stacked trays 5 on which the products are stored.

We can also see (FIGS. 4 and 5) how, after a product 6 has been deposited on the upper base of the body 10, the said body 10 has descended slightly and then (FIGS. 6 and 7) it has ascended until the product (marked with discontinuous lines) remains inside the microwave 12.

Once the product has been heated the body 10 descends and the platform 11 is displaced in a first movement closing the open upper base of the vertical duct 9, with the product remaining in relation to the hatch 13 of the external closing door 2 of the machine (FIGS. 8-11).

Next, once the product has been collected by the user, the body 10 ascends as far as the lower part of the platform 11 (FIGS. 12 and 13) in such a way that in a second displacement of the platform 11 from its position of closing the upper base of the vertical duct 9 as far as its rest position (FIGS. 14 and 15), it provokes a sweeping of the upper base of the body 10.

Finally, once the sweeping of the upper base of the body 10 has taken place, said body 10 descends as far as its initial position beneath the level of the hatch 7 of the internal door 3 (FIGS. 16 and 17) ready to receive a new product.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. SYSTEM FOR HEATING AND EXTRACTION OF FOOD PRODUCTS IN AUTOMATIC DISPENSING MACHINES, being of the type of automatic dispensing machine which is provided with cold equipment for maintenance of food products at a suitable conservation temperature until their consumption, being stored on a series of parallel trays and which upon their extraction are first of all transported to a transversal tray which is transverse to said series of parallel trays, and likewise have means of heating the products based on a microwave oven, the series of storage trays for the products being housed in a cubicle closed by an internal door, wherein the system comprises means of handling the products in their heating and extraction phase, said means of handling being connected by a an access hatch with a cubicle for the housing of storage trays for the products, and the means of handling the products in their heating and extraction phase being defined by: a vertical duct, open above and below, formed in relation to the access hatch for the products to dispense made in an internal door for closing and separating the cubicle for the housing of trays with the stored products; a body internal to the vertical duct with its upper base closed for the depositing of products to be dispensed via the access hatch of the internal door, said internal body being displaceable in the ascending-descending direction; a platform, horizontally displaceable, for closure of the open upper base of the vertical duct and sweeping of the upper base of the body internal to the vertical duct; a microwave oven with a lower opening of similar section to the body internal to the vertical duct, in relation to which it has been made, wherein following the dispensing, via the access hatch of the internal door for closing and separating the cubicle for housing the trays with the stored products and the depositing of the corresponding product on the upper base of the body internal to the vertical duct, the body ascends with the product to be heated deposited on its upper base as far as the interior of the microwave, said body closing the lower opening of the microwave.

2. SYSTEM FOR HEATING AND EXTRACTION OF FOOD PRODUCTS IN AUTOMATIC DISPENSING MACHINES, according to claim 1, wherein in a first displacement of the closing platform for the upper base of the vertical duct, from its rest position to that of closing the upper base of the vertical duct, the access hatch of the internal door becomes blocked, the body carrying the heated product having descended as far as leaving said product in relation to a delivery hatch of an external closing door of the machine for the product to be collected by the user via said hatch.

3. SYSTEM FOR HEATING AND EXTRACTION OF FOOD PRODUCTS IN AUTOMATIC DISPENSING MACHINES, according to claim 1, wherein following collection of the product by the user, the body on whose upper base the product was deposited ascends as far as the lower part of the closing platform for the open upper base of the vertical duct.

4. SYSTEM FOR HEATING AND EXTRACTION OF FOOD PRODUCTS IN AUTOMATIC DISPENSING MACHINES, according to claim 2, wherein following collection of the product by the user, the body on whose upper base the product was deposited ascends as far as the lower part of the closing platform for the open upper base of the vertical duct.

5. SYSTEM FOR HEATING AND EXTRACTION OF FOOD PRODUCTS IN AUTOMATIC DISPENSING MACHINES, according to claim 1, wherein a second displacement of the closing platform for the open upper base of the vertical duct, from its closed position of the upper base of the vertical duct to the rest position, with the upper base of the depositing body for the products under that platform, provokes a sweeping of the upper base of the body internal to the vertical duct.

6. SYSTEM FOR HEATING AND EXTRACTION OF FOOD PRODUCTS IN AUTOMATIC DISPENSING MACHINES, according to claim 2, wherein a second displacement of the closing platform for the open upper base of the vertical duct, from its closed position of the upper base of the vertical duct to the rest position, with the upper base of the depositing body for the products under that platform, provokes a sweeping of the upper base of the body internal to the vertical duct.

7. SYSTEM FOR HEATING AND EXTRACTION OF FOOD PRODUCTS IN AUTOMATIC DISPENSING MACHINES, according to claim 3, wherein a second displacement of the closing platform for the open upper base of the vertical duct, from its closed position of the upper base of the vertical duct to the rest position, with the upper base of the depositing body for the products under that platform, provokes a sweeping of the upper base of the body internal to the vertical duct.

8. SYSTEM FOR HEATING AND EXTRACTION OF FOOD PRODUCTS IN AUTOMATIC DISPENSING MACHINES, according to claim 4, wherein a second displacement of the closing platform for the open upper base of the vertical duct, from its closed position of the upper base of the vertical duct to the rest position, with the upper base of the depositing body for the products under that platform, provokes a sweeping of the upper base of the body internal to the vertical duct.

9. SYSTEM FOR HEATING AND EXTRACTION OF FOOD PRODUCTS IN AUTOMATIC DISPENSING MACHINES, according to claim 1, wherein in the sweeping of the upper base of the body internal to the vertical duct by means of the upper platform, any possible object deposited thereon will be displaced to a collection receptacle.

10. SYSTEM FOR HEATING AND EXTRACTION OF FOOD PRODUCTS IN AUTOMATIC DISPENSING MACHINES, according to claim 3, wherein in the sweeping of the upper base of the body internal to the vertical duct by means of the upper platform, any possible object deposited thereon will be displaced to a collection receptacle.

11. SYSTEM FOR HEATING AND EXTRACTION OF FOOD PRODUCTS IN AUTOMATIC DISPENSING MACHINES, according to claim 4, wherein in the sweeping of the upper base of the body internal to the vertical duct by means of the upper platform, any possible object deposited thereon will be displaced to a collection receptacle.

12. SYSTEM FOR HEATING AND EXTRACTION OF FOOD PRODUCTS IN AUTOMATIC DISPENSING MACHINES, according to claim 5, wherein in the sweeping of the upper base of the body internal to the vertical duct by means of the upper platform, any possible object deposited thereon will be displaced to a collection receptacle.

13. SYSTEM FOR HEATING AND EXTRACTION OF FOOD PRODUCTS IN AUTOMATIC DISPENSING MACHINES, according to claim 6, wherein in the sweeping of the upper base of the body internal to the vertical duct by means of the upper platform, any possible object deposited thereon will be displaced to a collection receptacle.

14. SYSTEM FOR HEATING AND EXTRACTION OF FOOD PRODUCTS IN AUTOMATIC DISPENSING MACHINES, according to claim 7, wherein in the sweeping of the upper base of the body internal to the vertical duct by means of the upper platform, any possible object deposited thereon will be displaced to a collection receptacle.

15. SYSTEM FOR HEATING AND EXTRACTION OF FOOD PRODUCTS IN AUTOMATIC DISPENSING MACHINES, according to claim 8, wherein in the sweeping of the upper base of the body internal to the vertical duct by means of the upper platform, any possible object deposited thereon will be displaced to a collection receptacle.

16. SYSTEM FOR HEATING AND EXTRACTION OF FOOD PRODUCTS IN AUTOMATIC DISPENSING MACHINES, according to claim 1, wherein after the sweeping of the upper base of the body internal to the vertical duct, said body descends to its initial rest position with its upper base closed at a level below the access hatch of the internal door for closing and separating the cubicle for housing the storage trays for the products.

* * * * *